US009776693B2

(12) United States Patent
Rikoski et al.

(10) Patent No.: US 9,776,693 B2
(45) Date of Patent: Oct. 3, 2017

(54) SYSTEMS AND METHODS FOR IMPROVING BUOYANCY IN UNDERWATER VEHICLES

(71) Applicant: Hadal, Inc., Oakland, CA (US)

(72) Inventors: Richard J. Rikoski, Alameda, CA (US); Jonathan Pompa, Long Beach, CA (US); Robert S. Damus, Alameda, CA (US); Dylan Owens, San Jose, CA (US)

(73) Assignee: HADAL, INC., Oakland, CA (US)

( * ) Notice: Subject to any disclaimer, the term of this patent is extended or adjusted under 35 U.S.C. 154(b) by 703 days.

(21) Appl. No.: 14/209,911

(22) Filed: Mar. 13, 2014

(65) Prior Publication Data

US 2014/0272230 A1    Sep. 18, 2014

Related U.S. Application Data

(60) Provisional application No. 61/792,708, filed on Mar. 15, 2013.

(51) Int. Cl.
*B63B 35/40* (2006.01)
*B22D 31/00* (2006.01)
(Continued)

(52) U.S. Cl.
CPC ............. *B63B 35/40* (2013.01); *B22D 31/00* (2013.01); *B29C 44/3415* (2013.01); *B63B 3/13* (2013.01);
(Continued)

(58) Field of Classification Search
CPC  B63B 35/40; B63B 3/13; B63B 27/16; B63B 27/36; B22D 31/00; B29C 44/3415; B29C 70/66
See application file for complete search history.

(56) References Cited

U.S. PATENT DOCUMENTS 3,622,437 A    11/1971  Hobaica et al.
4,040,165 A *   8/1977  Miessler ............... B29C 70/025
                                                    138/149

(Continued)

FOREIGN PATENT DOCUMENTS

DE    10 2006 02922    12/2007
GB    1 153 248 A       5/1969
(Continued)

*Primary Examiner* — Stella Yi
(74) *Attorney, Agent, or Firm* — White & Case LLP (57) ABSTRACT

Systems and methods for adding buoyancy to an object are described herein. A buoyant material may be enclosed inside a flexible container, heated, and inserted into a free flooded cavity inside the object. The flexible container may then be formed to the shape of the cavity. After the flexible container is formed to the shape of the cavity, the flexible container may be cooled. The flexible container may hold a predetermined amount of the syntactic material that provides a fixed amount of buoyancy. According to another aspect, systems and methods for packing a vehicle are described herein. In some embodiments, a buoyant material may be molded into the shape of a hull of a vehicle, and a plurality of cutouts may be extracted from the buoyant material which are specifically designed to incorporate one or more instruments.

17 Claims, 8 Drawing Sheets

(51) Int. Cl.

| | | |
|---|---|---|
| *F17C 1/00* | (2006.01) | |
| *B63G 8/00* | (2006.01) | |
| *B63G 8/39* | (2006.01) | |
| *B29C 44/34* | (2006.01) | |
| *B63B 3/13* | (2006.01) | |
| *H01M 2/02* | (2006.01) | |
| *H01M 10/052* | (2010.01) | |
| *H01M 10/42* | (2006.01) | |
| *B63B 27/16* | (2006.01) | |
| *B63B 27/36* | (2006.01) | |
| *G01S 7/52* | (2006.01) | |
| *G01S 15/10* | (2006.01) | |
| *G01S 15/60* | (2006.01) | |
| *G01S 15/02* | (2006.01) | |
| *G01S 15/58* | (2006.01) | |
| *G01S 15/89* | (2006.01) | |

(52) U.S. Cl.
CPC ............. *B63B 27/16* (2013.01); *B63B 27/36* (2013.01); *B63G 8/00* (2013.01); *B63G 8/001* (2013.01); *B63G 8/39* (2013.01); *F17C 1/00* (2013.01); *G01S 7/52004* (2013.01); *G01S 15/02* (2013.01); *G01S 15/104* (2013.01); *G01S 15/588* (2013.01); *G01S 15/60* (2013.01); *H01M 2/024* (2013.01); *H01M 2/025* (2013.01); *H01M 10/052* (2013.01); *H01M 10/4257* (2013.01); *B63B 2027/165* (2013.01); *B63B 2035/405* (2013.01); *B63G 2008/004* (2013.01); *B63G 2008/008* (2013.01); *G01S 15/107* (2013.01); *G01S 15/8904* (2013.01); *Y10T 29/49117* (2015.01); *Y10T 29/49826* (2015.01); *Y10T 29/49893* (2015.01); *Y10T 29/49989* (2015.01); *Y10T 29/5176* (2015.01); *Y10T 428/1352* (2015.01); *Y10T 428/1376* (2015.01)

(56) References Cited

U.S. PATENT DOCUMENTS

| | | |
|---|---|---|
| 4,202,036 A | 5/1980 | Bowditch et al. |
| 6,153,294 A | 11/2000 | Patton et al. |
| 8,381,672 B1 | 2/2013 | Eriksen |
| 2008/0262666 A1 | 10/2008 | Manning |
| 2013/0059489 A1 | 3/2013 | Vlock et al. |

FOREIGN PATENT DOCUMENTS

| | | |
|---|---|---|
| WO | WO-93/17334 A1 | 9/1993 |
| WO | WO-2008/000305 A1 | 1/2008 |
| WO | WO-2010/063856 A1 | 6/2010 |

* cited by examiner

SYSTEMS AND METHODS FOR IMPROVING BUOYANCY IN UNDERWATER VEHICLES

CROSS-REFERENCE TO RELATED APPLICATIONS

This application claims the benefit of U.S. Provisional Application Ser. No. 61/792,708, filed Mar. 15, 2013, the contents of which are incorporated by reference herein in its entirety.

BACKGROUND

When building flooded hull-type autonomous underwater vehicles (AUV), the component arrangement is typically designed first and buoyancy foam is subsequently packed around the components. This method of packing an AUV may require machining several custom pieces of buoyancy foam. However, while buoyancy foam may be machined with relatively great precision, the machining takes times and is expensive, increasing the cost of manufacture. Therefore, there exists a need for a more efficient method of packing a vehicle.

Furthermore, a vehicle such as an AUV may be built with a monocoque structure. Such vehicles may have an external shell, such as a carbon-fiber or fiberglass shell, and a buoyant material to support the shell, such as a syntactic foam. Although the buoyant material is typically machined to the shape of the external shell, the machined foam and the external shell may not fit exactly together, resulting in empty cavities. Reduced packing efficiency reduces the overall effective energy density of the vehicle. Such cavities provide opportunities to add buoyancy to the vehicle or object, but these cavities often have poor access and/or irregular shapes. Moreover, some situations call for a fixed amount of buoyancy to be added to a vehicle or object, such as when moving between waters of different densities. Thus, a need exists for a method to add buoyancy to irregularly-shaped cavities.

SUMMARY

Systems and methods for adding buoyancy to an object are described herein. According to one aspect, a syntactic material is enclosed inside a flexible container. In some embodiments, the syntactic material may be a syntactic wax or a syntactic oil. In some embodiments, the flexible container is heated and inserted into a free flooded cavity inside the object. The object may be an autonomous underwater vehicle (AUV), a remotely operated vehicle (ROV), a buoy, a seaplane, an autonomous surface vessel, an exploratory robot, a sensor, or a salvage object. The flexible container may then be formed to the shape of the cavity. In alternate embodiments, the flexible container is first inserted into the free flooded cavity before being heated and formed to the shape of the cavity. The flexible container and syntactic material may be inserted into the cavity in any suitable fashion, including, for example, pumping the syntactic material into the flexible container. After the flexible container is formed to the shape of the cavity, the flexible container may be cooled.

The flexible container may hold a pre-determined amount of the syntactic material that provides a fixed amount of buoyancy. In some embodiments, the flexible container may be heated by placing the flexible container into hot water or hot air. In some embodiments, the syntactic material may be substantially malleable at a first temperature, such as room temperature or a temperature while heating, and rigid at a second temperature that is lower than the first temperature, such as ocean or an operating temperature. In some embodiments, the syntactic material becomes substantially malleable at around 10 degrees Celsius and rigid at temperatures below 10 degrees Celsius. The flexible container may be made from rubber, plastic, or any other suitable flexible material.

In other embodiments, the syntactic material may be transitioned from a formable state to a substantially rigid state by activating a chemical hardening process. Available processes for achieving this transition are exposure to ultraviolet light, exposure to heat, or mixture of two or more chemical components which subsequently form a substantially solid reaction product. In an embodiment with separate chemical components, the components of the chemical mixture may be contained in separate chambers or individual containers within the buoyancy unit overall container. The internal containers or separators may be breached to allow mixing just prior to installation so that the solidification process of the buoyant material occurs after the material has been placed in the target cavity.

Embodiments of the buoyancy unit can also be produced in which the buoyant material remains flexible during use but the container can be changed from flexible to rigid after the buoyancy unit has been installed. For example, the buoyant material may be a syntactic oil that stays fluid, while the container may transition from flexible to rigid with the application of heat and/or ultraviolet light. Such embodiments may use a container constructed of a thermoplastic material with a softening temperature less than 100 C but higher than the expected operating temperature of the system so that they may be softened by immersion in boiling water and will passively harden by cooling after installation in the cavity.

According to another aspect, systems and methods for packing a vehicle are described herein. The vehicle may include an external structure or shell structure such as hull and/or fairing. In some embodiments, a buoyant material may be molded into the shape of a shell structure, e.g., the hull, of a vehicle. In some materials, the buoyant material is a syntactic foam. A plurality of cutouts may be extracted from the buoyant material, and a plurality of instruments may be placed inside the plurality of cutouts. In some embodiments, the plurality of instruments may be supported by spring-loaded bracketry. The spring-loaded bracketry may flex with increased pressure. In some embodiments, the bracketry may include slots which allow the bracketry to support or constrain the plurality of instruments in one dimension while allowing free movement or slippage in another dimension.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative embodiments are set forth in the following figures.

DETAILED DESCRIPTION

To provide an overall understanding of the invention, certain illustrative embodiments will now be described. However, it will be understood by one of ordinary skill in the art that the systems and methods described herein can be adapted and modified for other suitable applications and that such other additions and modifications will not depart from the scope hereof.

Maximizing the buoyancy of a given volumetric shape, such as that of an hydrodynamically optimized rotationally symmetric AUV, requires reducing the amount of material used in structure so that more weight can be attributed to buoyancy and payload. For a shape with a circular cross section, the optimal way to reduce structural mass is by increasing the moment of area; i.e., placing material as far away from the geometric center of the volume as possible.

In some embodiments a monocoque arrangement is used to transfer load continuously through the structure with minimal regions of stress concentration. In such an embodiment, the AUV's hull serves dual purpose as both a fairing and structure, and the designer can therefore optimize the hull thickness to maximize packing efficiency of the internal arrangement of buoyancy foam and components. The interior surface of the hull structure is therefore the bounding envelope for components such as buoyancy foam, sensors, and payload.

Syntactic foam and syntactic wax are buoyancy materials using microstructures, such as microspheres or nanotoruses. Syntactic wax embeds the microstructures in a wax, while syntactic foam embeds the microstructures in a resin. Syntactic wax has been used in salvage operations because it is relatively soft and can be pumped into sunken vessels. Syntactic foam is preferred for vehicle applications because it is relatively rigid and can be used structurally (one must accommodate its limited strength and brittle nature).

Both materials, however, have limitations when applied to underwater vehicles. Syntactic wax is very weak, so it cannot be used structurally, and it is very difficult to tie down (since it can easily break). In a wet flooded vehicle, the wax may be left to float around, but the free-floating wax may interfere with other components or instruments, which is undesirable. It can also change the center of buoyancy of the vehicle, leading to undesirable trim. Also, many components in wet flooded vehicles are oil compensated, and mineral oil dissolves wax. An oil leak may dissolve any free-floating wax and allow the wax to pour out of the vehicle, destroying a vehicle's buoyancy. This would likely lead to loss of the vehicle. However, wax may be easily be shaped.

Syntactic foam may be machined with relatively great precision, but machining takes times and is expensive. Moreover, the precision of the hull is often considerably coarser than that of machined foam, especially when the hull comprises carbon fiber/fiberglass layups. Precisely machined blocks of foam typically require additional grinding or adjustments to fit inside a vehicle. Alternatively, the blocks of foam may be machined to leave space so that the blocks will not bind, but this comes at the expense of buoyancy (which in turn means fewer batteries, lower energy density, and a reduced mission profile). As an alternative, blocks of syntactic foam may be nestled into a warm wax, but the wax will likely wear, break off, and/or dissolve.

These voids between the hull and buoyant material in a vehicle or object present opportunities to create buoyancy if foam could be squeezed into the void. However, these voids often have poor access and very awkward shapes. In other situations, there exists a need to add a fixed amount of buoyancy to a vehicle or object, such as when moving between waters of different densities. Syntactic wax may be squeezed into these voids to add a fixed amount of buoyancy, but the syntactic wax may chip, break, floating away, and/or dissolve.

The systems and methods described herein describe adding buoyancy to an object. According to one aspect, a syntactic material is enclosed inside a flexible container. In some embodiments, the syntactic material may be a syntactic wax or a syntactic oil. In some embodiments, the flexible container is heated and inserted into a free flooded cavity inside the object. The object may be an autonomous underwater vehicle (AUV), a remotely operated vehicle (ROV), a buoy, a seaplane, an autonomous surface vessel, an exploratory robot, a sensor, or a salvage object. The flexible container may then be formed to the shape of the cavity. The flexible container may be squeezed through a small hole into a large void. In alternate embodiments, the flexible container is first inserted into the free flooded cavity before being heated and formed to the shape of the cavity. The flexible container and syntactic material may be inserted into the cavity in any suitable fashion, including, for example, pumping the syntactic material into the flexible container. After the flexible container is formed to the shape of the cavity, the flexible container may be cooled. In some embodiments, the flexible container may be removed and reused, leaving behind the syntactic material. In some embodiments, the flexible container may be removed by heating.

The flexible container may hold a pre-determined amount of the syntactic material that provides a fixed amount of buoyancy (with the understanding that buoyancy is a function of water density so the buoyancy the flexible container provides will vary with conditions). In some embodiments, the flexible container may be heated by placing the flexible container into hot water or hot air. In some embodiments, the syntactic material may be substantially malleable at a first temperature, such as room temperature or a temperature while heating, and rigid at a second temperature that is lower than the first temperature, such as ocean or an operating temperature. The flexible container may be made from rubber, plastic, or any other suitable flexible material.

According to another aspect, systems and methods for packing a vehicle are described herein. In some embodiments, a buoyant material may be molded into the shape of a hull of a vehicle. In some materials, the buoyant material is a syntactic foam, which can be machined with precision ground surfaces. In order to maximize buoyancy and minimize the amount of buoyant material lost, a plurality of cutouts may be extracted from the buoyant material to fit specific pieces of equipment. A plurality of instruments may be placed inside the plurality of cutouts. In some embodiments, the plurality of instruments may be supported by spring-loaded bracketry. The spring-loaded bracketry may flex with increased pressure. In some embodiments, the bracketry may include slots which allow the bracketry to support or constrain the plurality of instruments in one dimension while allowing free movement or slippage in another dimension. In this way, the packing philosophy shifts from "pack foam around everything" to "cut holes into the foam to fit specific objects."

Figure 1:
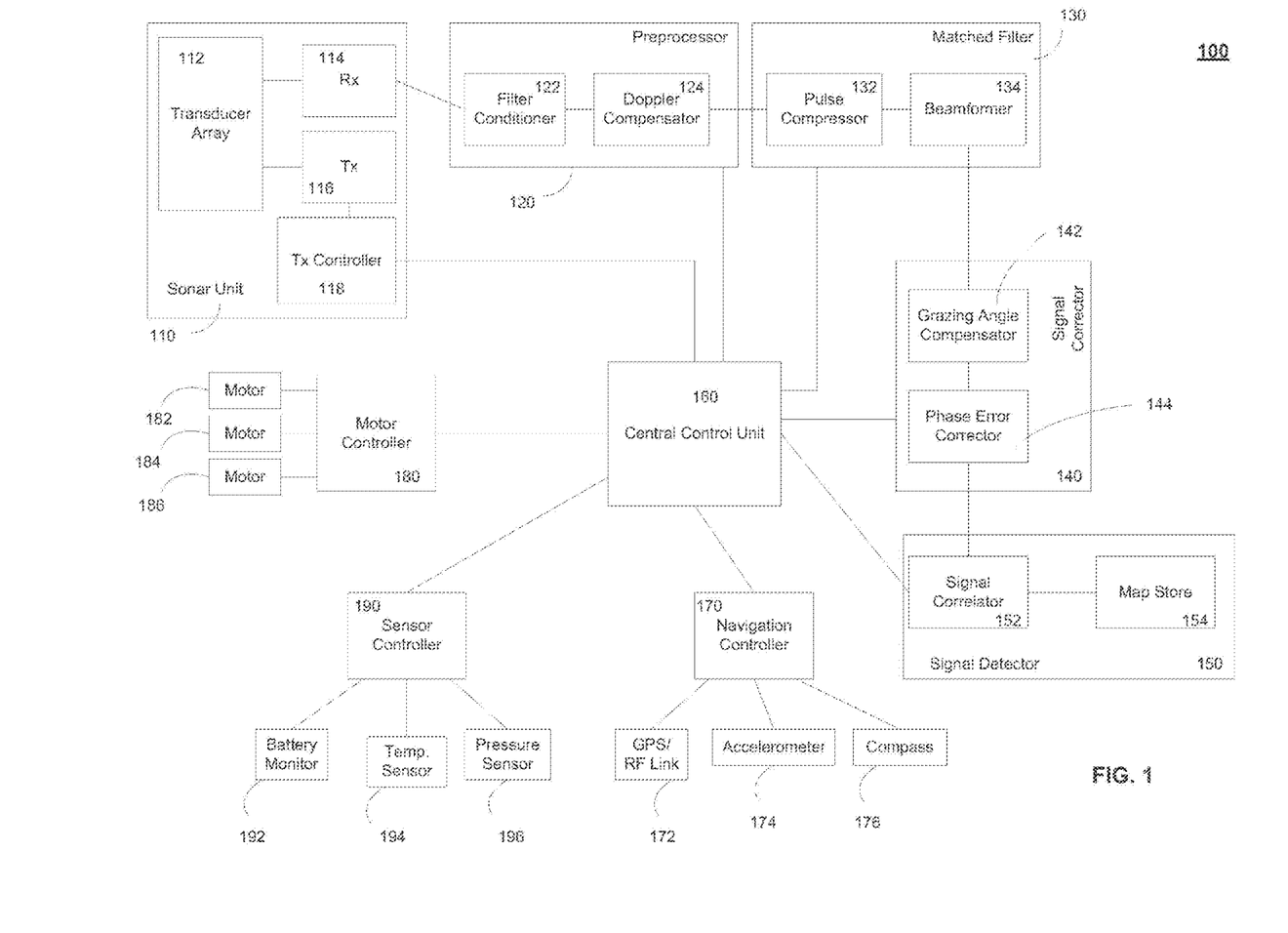
FIG. 1 is a block diagram depicting an exemplary remote vehicle, according to an illustrative embodiment of the present disclosure.

FIG. 1 is a block diagram depicting an illustrative remote vehicle, according to an illustrative embodiment of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some embodiments, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain embodiments, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain embodiments, the peak of the envelope may be identified with high-precision, including down to the order of about $1/100^{th}$ of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain embodiments the transducer array 112 includes separate projectors and receivers. The transducer array 112 may be configured to operate in SAS mode (either stripmap or spotlight mode) or in a real aperture mode. In certain embodiments, the transducer array 112 is configured to operate as a multibeam echo sounder, sidescan sonar or sectorscan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping.

The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one embodiment, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain embodiments the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
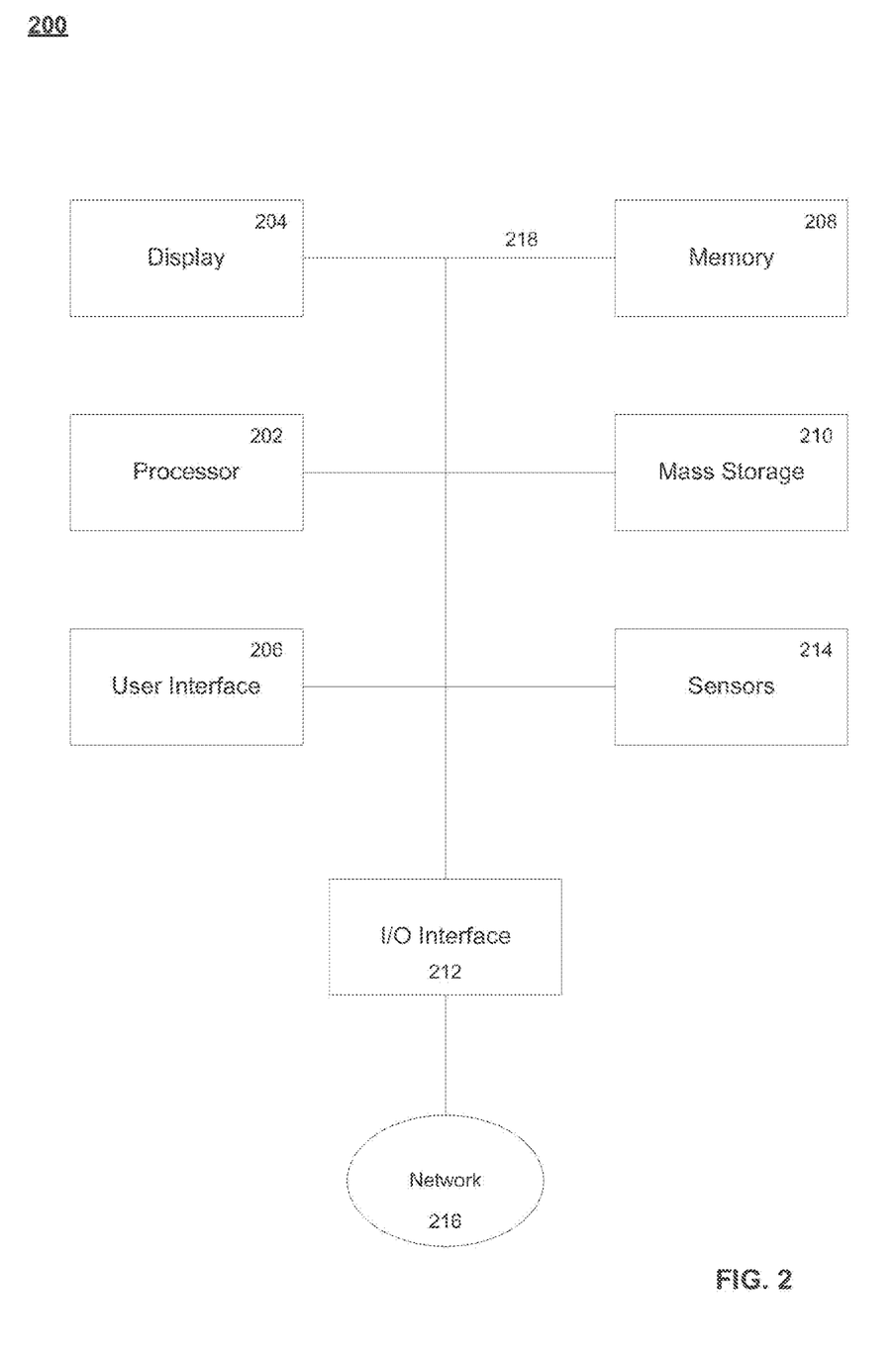
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative embodiment of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208. In some embodiments, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some embodiments, communications may occur over an acoustic modem. For instance, for AUVs, communications may occur over such a modem. Alternatively, the system 200 may include a mainframe or other type of host computer system capable of web-based communications via the network 216.

In some embodiments, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some embodiments, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some embodiments, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some embodiments, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
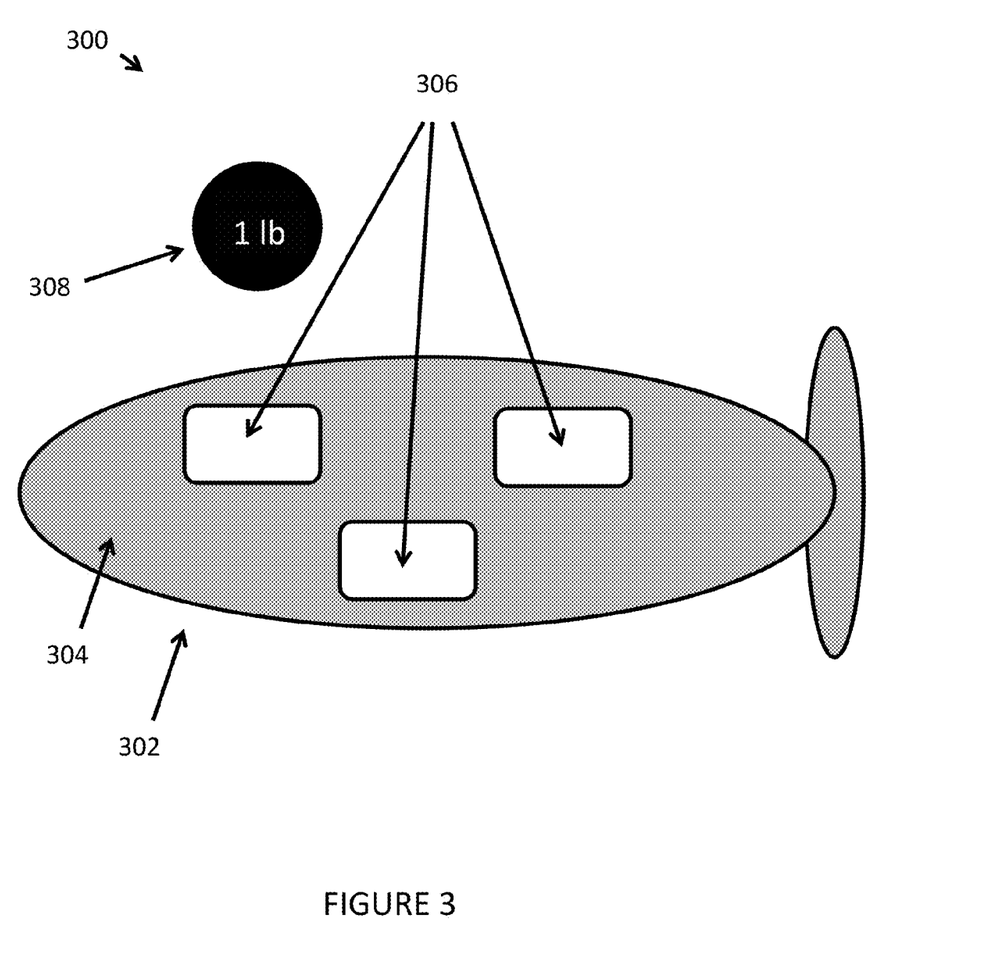
FIG. 3 is a cross-sectional view of a vehicle with cutouts and a flexible container with buoyant material according to one illustrative embodiment.

FIG. 3 is a cross-sectional view of a vehicle 302 with cutouts and a flexible container 308 according to one illustrative embodiment. System 300 may include vehicle 302 filled with a first buoyant material 304. The vehicle 302 may have cavities 306 that are not filled with the first buoyant material 304. The flexible container 308 may be filled with a second buoyant material that may be the same, or different, as the first buoyant material 304. The flexible container 308 may provide a fixed amount of buoyancy. In the illustrative embodiment depicted in FIG. 1, flexible container 308 adds one pound of buoyancy.

Vehicle 302 may be any vehicle or object designed to travel through a medium. In some embodiments, vehicle 302 may be an AUV, a remotely operated vehicle (ROV), a buoy, a seaplane, an autonomous surface vessel, an exploratory robot, a sensor, or a salvage object. The vehicle 302 may be designed to travel through any suitable medium, including water or air. The vehicle 302 may be designed as a monocoque structure, with an external shell being supported by a first buoyant material. For example, vehicle 302 may comprise a carbon fiber or fiberglass external shell supported by first buoyant material 304. First buoyant material 304 may comprises any suitable buoyant material, including a syntactic foam. Vehicle 302 may include one or more cavities 306. In some embodiments, cavities 306 may be intentionally machined into first buoyant material 304. For example, cavities 306 may be specifically designed to fit particular components or instruments. In alternate embodiments, cavities 306 may not be intentional and may be arbitrarily spaced. For example, first buoyant material 304 may not exactly match the external shell of vehicle 302. Cavities 306 may include a space between first buoyant material 304 and the external shell.

Flexible container 308 may be made from any suitable flexible material, including rubber or plastic. Flexible container 308 may include any suitable opening or valve for introducing a second buoyant material into flexible container 308. In some embodiments, the second buoyant material may comprise a syntactic material. The second buoyant material may be introduced into the flexible container 308 using any suitable technique. For example, the second buoyant material may be placed into flexible container 308, and flexible container 308 may be sealed around the second buoyant material. In other embodiments, the second buoyant material may be pumped into the flexible container 308 through a valve or any other suitable opening. The flexible container 308 may be provided in any suitable shape, including, but not limited to, a sphere or a block. At room temperature (e.g., approximately 65 to 85 degrees Fahrenheit), the flexible container 308 and the second buoyant material may be relatively malleable. At lower temperatures, such as room temperature or a designed operating temperature of an AUV, the flexible container 308 and the second buoyant material may be substantially rigid.

Figure 4:
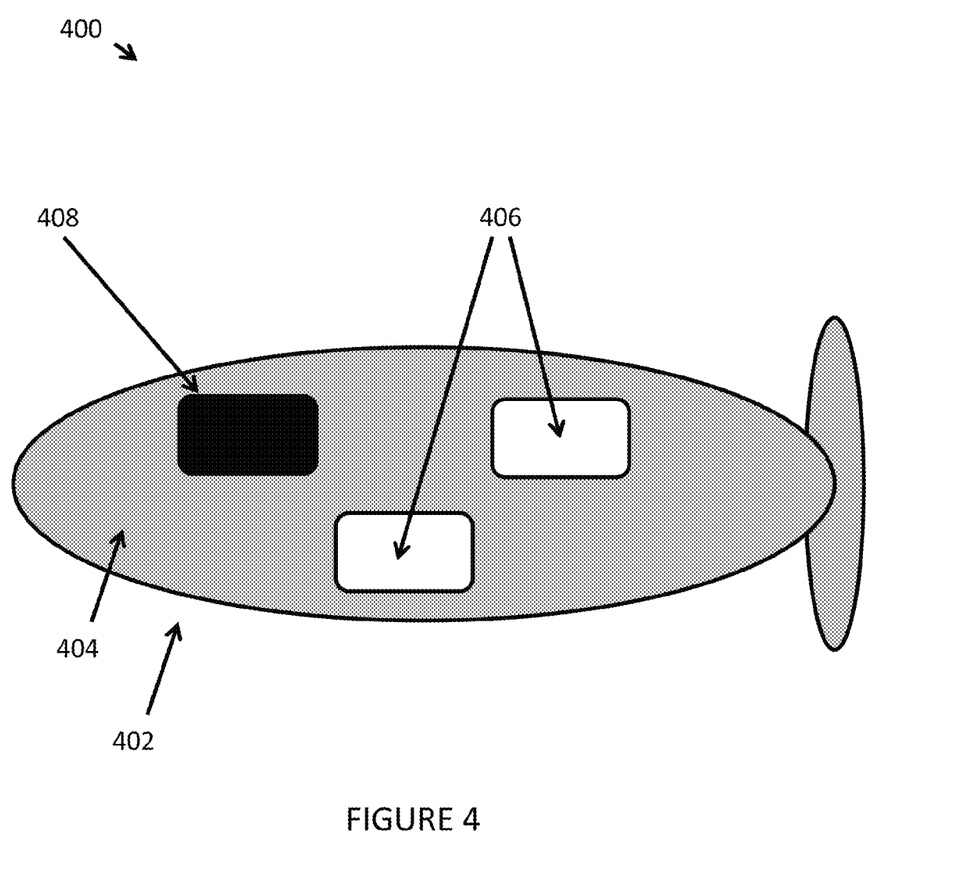
FIG. 4 is a cross-sectional view of a vehicle with buoyant material inside one cutout according to one illustrative embodiment.

FIG. 4 is a cross-sectional view of a vehicle with buoyant material inside one cutout according to one illustrative embodiment. System 400 may include vehicle 402 filled with a first buoyant material 404. The vehicle 402 may have cavities 406 that are not filled with the first buoyant material 304. The cavity 408 may be filled with a flexible container that contains a second buoyant material, such as flexible container 308 depicted in FIG. 3.

Vehicle 402 may be any vehicle or object designed to travel through a medium. In some embodiments, vehicle 402 may be an AUV, a remotely operated vehicle (ROV), a buoy, a seaplane, an autonomous surface vessel, an exploratory robot, a sensor, or a salvage object. The vehicle 402 may be designed to travel through any suitable medium, including water or air. The vehicle 402 may be designed as a monocoque structure, with an external shell being supported by a first buoyant material. For example, vehicle 402 may comprise a carbon fiber or fiberglass external shell supported by first buoyant material 404. First buoyant material 404 may comprises any suitable buoyant material, including a syntactic material such as syntactic wax, syntactic foam, syntactic oil, or a combination thereof. Vehicle 402 may include one or more cavities 406. In some embodiments, cavities 406 may be intentionally machined into first buoyant material 404. For example, cavities 406 may be specifically designed to fit particular components or instruments. In alternate embodiments, cavities 406 may not be intentional and may be arbitrarily spaced. For example, first buoyant material 404 may not exactly match the external shell of vehicle 402. Cavities 406 may include a space between first buoyant material 404 and the external shell.

As discussed above, cavity 408 may include a flexible container that contains a second buoyant material, such as flexible container 308 depicted in FIG. 3. As with cavities 406, cavity 408 may be intentionally machined into first buoyant material 404. In alternate embodiments, cavity 408 may not be intentional and may be arbitrarily spaced. For example, cavities 408 may include a space between first buoyant material 404 and the external shell. In some embodiments, the second buoyant material may comprise a syntactic material. The flexible container may be introduced into cavity 408 using any suitable method. In some embodiments, flexible container may be heated prior to inserting into cavity 408, molded into the shape of cavity 408, and subsequently cooled. In alternate embodiments, flexible container may first be inserted into cavity 408 and subsequently heated and molded into the shape of cavity 408, before being cooled. The flexible container may be removed from cavity 408, leaving behind the second buoyant material in cavity 408.

Figure 5:
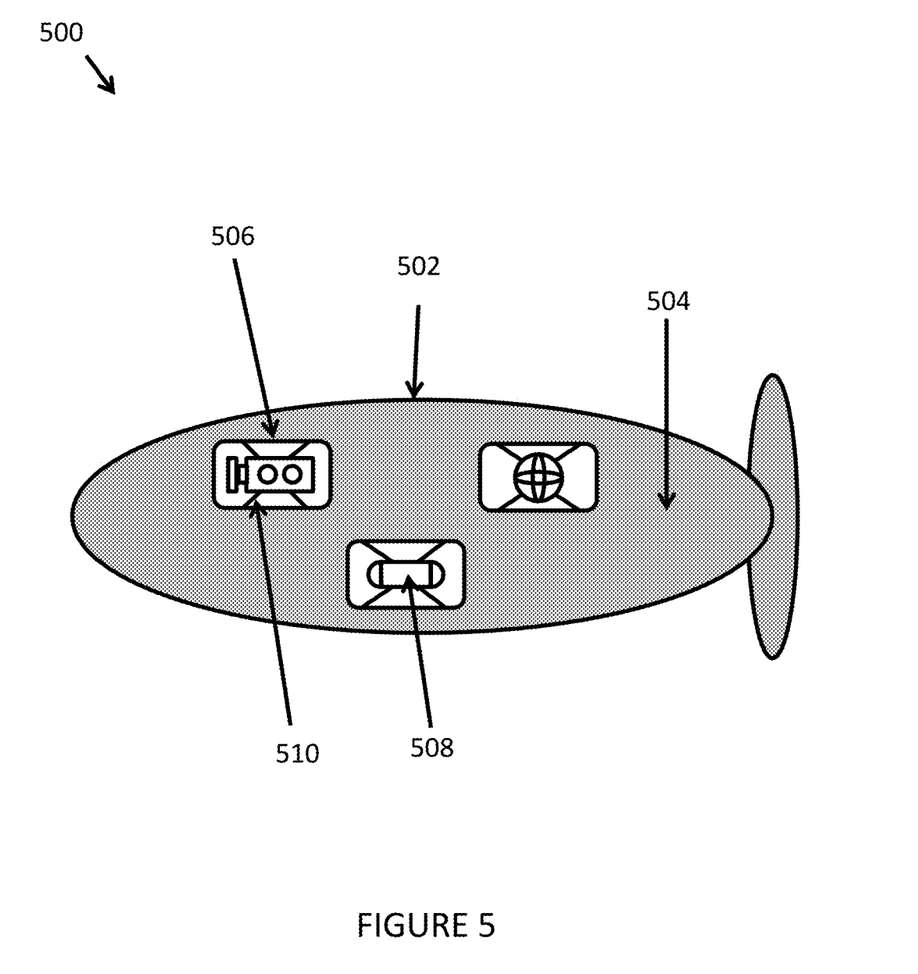
FIG. 5 is a cross-sectional view of a vehicle with instruments inside cutouts according to one illustrative embodiment.

FIG. 5 is a cross-sectional view of a vehicle with instruments inside cutouts according to one illustrative embodiment. System 500 may include vehicle 502 filled with a first buoyant material 504. The vehicle 502 may have cutouts 506 that are not filled with the first buoyant material 504. The cutouts 506 may each contain one or more components 508 supported by bracketry 510.

Vehicle 502 may be any vehicle or object designed to travel through a medium. In some embodiments, vehicle 502 may be an AUV, a remotely operated vehicle (ROV), a buoy, a seaplane, an autonomous surface vessel, an exploratory robot, a sensor, or a salvage object. The vehicle 502 may be designed to travel through any suitable medium, including water or air. The vehicle 502 may be designed as a monocoque structure, with an external shell being supported by a first buoyant material. For example, vehicle 502 may comprise a carbon fiber or fiberglass external shell supported by first buoyant material 504. First buoyant material 504 may comprises any suitable buoyant material, including a syntactic foam.

Cutouts 506 may be intentionally machined into first buoyant material 504 to fit particular components 508 of vehicle 502. For example, components 508 may be scientific equipment, such as the sensors and instruments depicted in FIG. 1, and each of cutouts 506 may be specifically designed to fit one or more of the scientific instruments. In some embodiments, the components 508 may be supported by bracketry 510. Bracketry 510 may be spring-loaded to absorb shock. In some embodiments, bracketry 510 may flex with increased pressure. For example, the vehicle 502 may be a free flooded AUV with the cutouts 506 filled with ocean water at the same pressure as the ambient pressure outside the vehicle 502. In such embodiments, the bracketry 510 may flex under the increased pressure.

Figure 6:
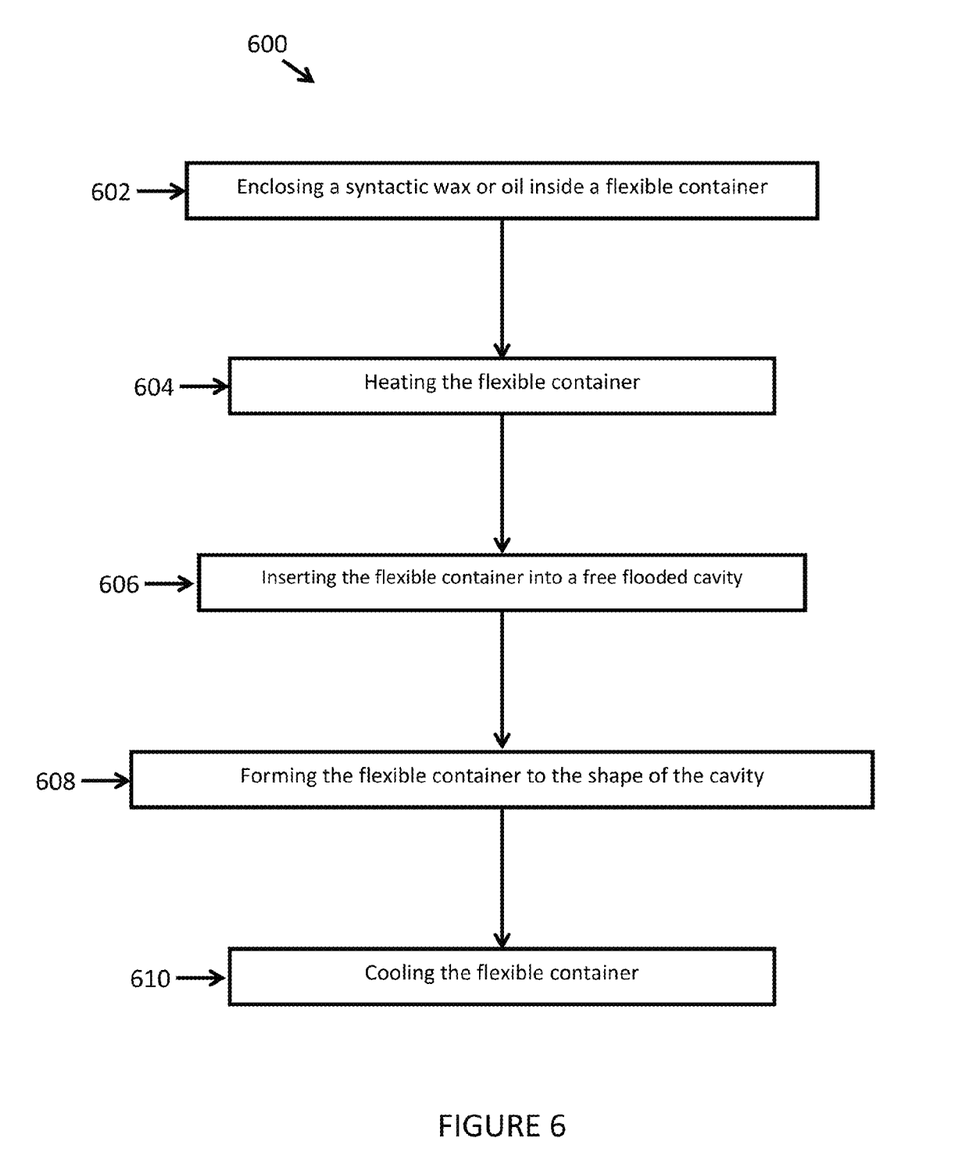
FIG. 6 depicts a process for adding buoyancy to an object according to one illustrative embodiment.

FIG. 6 depicts a process for adding buoyancy to an object according to one illustrative embodiment. Process 600 comprises enclosing a syntactic material inside a flexible container at step 602, heating the flexible container at step 604, inserting the flexible container into a free flooded cavity in step 606, forming the flexible container to the shape of the cavity at step 608, and cooling the flexible container at step 610.

At step 602, a syntactic material may be enclosed inside a flexible container. IN some embodiments, the syntactic material may be a syntactic wax or a syntactic oil. The syntactic material may be enclosed using any suitable method. In some embodiments, the syntactic material may be placed into the flexible container, and flexible container may be sealed around the syntactic material. In other embodiments, the syntactic material may be pumped into the flexible container through a valve or any other suitable opening, which is then sealed subsequent to the pumping. In some embodiments, the syntactic material may be placed into the flexible container, and the flexible container may be vacuum sealed. The flexible container may be provided in any suitable shape, including, but not limited to, a sphere or a block. At room temperature (e.g., approximately 65 to 85 degrees Fahrenheit), the flexible container and the syntactic material may be relatively malleable. At lower temperatures, such as room temperature or a designed operating temperature of an AUV, the flexible container and the syntactic material may be substantially rigid.

At step 604, the flexible container may be heated. The flexible container may be heated using any suitable method, including submerging the flexible container to hot water or exposing the flexible container to hot air. Heating may make the flexible container relatively more malleable than prior to heating.

At step 606, the flexible container may be inserted into the free flooded cavity. The container may be inserted in any suitable fashion, including pumping or extruding the flexible container and the syntactic material into the free flooded cavity.

At step 608, the flexible container may be formed to the shape of the cavity. The heated flexible container may be substantially malleable and easily conformed to the shape of the cavity. At step 610, the flexible container may be cooled. As it cools, the flexible container and the syntactic material may become relatively rigid. Optionally, the flexible container may be removed after cooling, leaving behind the syntactic material inside the free flooded cavity. Removing the flexible container may involve temporarily reheating the flexible container and/or the syntactic material. In some embodiments, the flexible container may be cleaned and reused after removal.

Figure 7:
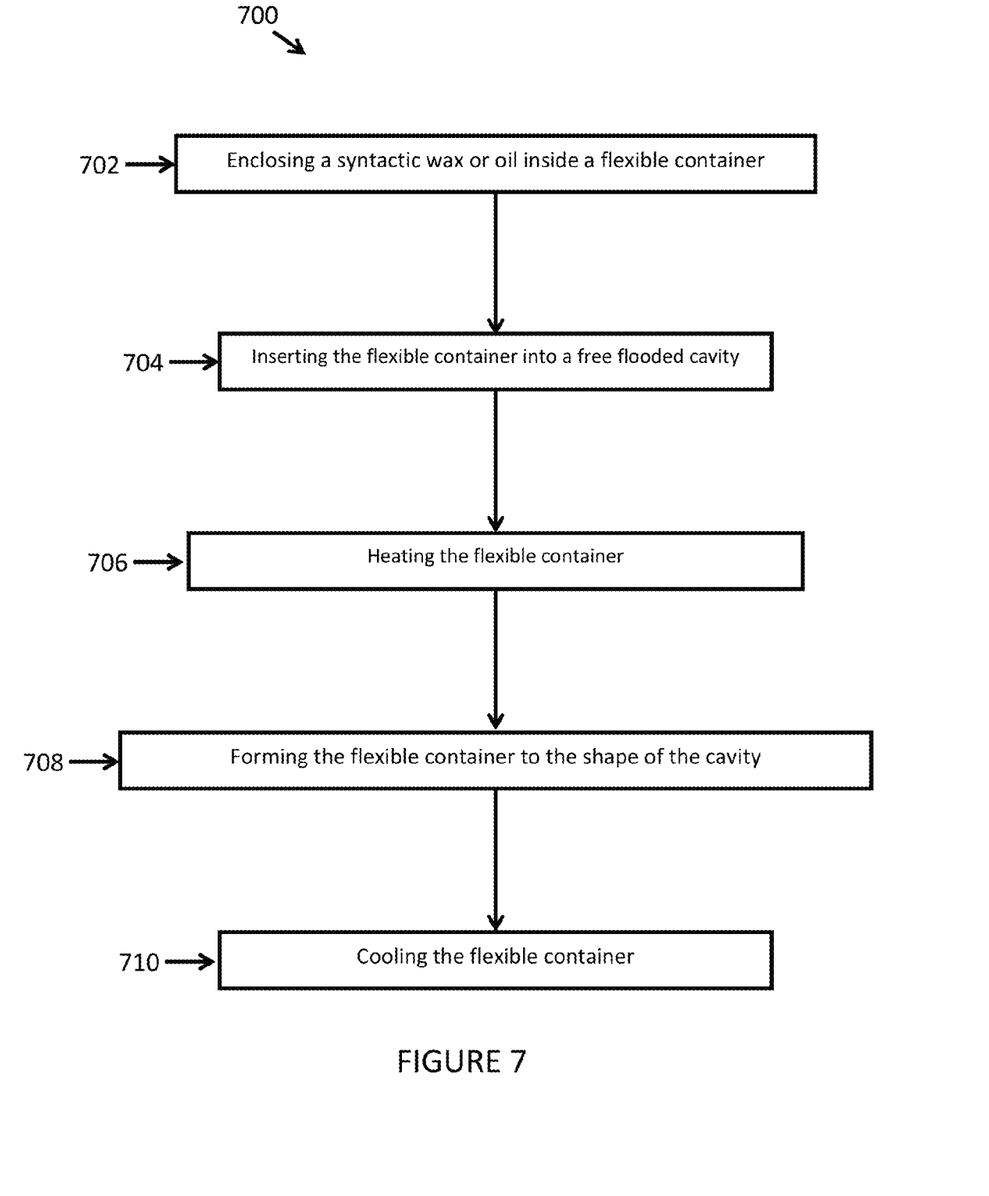
FIG. 7 depicts an alternate process for adding buoyancy to an object according to one illustrative embodiment.

FIG. 7 depicts an alternate process for adding buoyancy to an object according to one illustrative embodiment. Process 700 comprises enclosing a syntactic material inside a flexible container at step 702, inserting the flexible container into a free flooded cavity in step 704, heating the flexible container at step 706, forming the flexible container to the shape of the cavity at step 708, and cooling the flexible container at step 710.

At step 702, a syntactic material may be enclosed inside a flexible container. The syntactic material may be enclosed using any suitable method. In some embodiments, the syntactic material may be placed into the flexible container, and flexible container may be sealed around the syntactic material. In other embodiments, the syntactic material may be pumped into the flexible container through a valve or any other suitable opening, which is then sealed subsequent to the pumping. In some embodiments, the syntactic material may be placed into the flexible container, and the flexible container may be vacuum sealed. The flexible container may be provided in any suitable shape, including, but not limited to, a sphere or a block. At room temperature (e.g., approximately 65 to 85 degrees Fahrenheit), the flexible container and the syntactic material may be relatively malleable. At lower temperatures, such as room temperature or a designed operating temperature of an AUV, the flexible container and the syntactic material may be substantially rigid.

At step 704, the flexible container may be inserted into the free flooded cavity. The container may be inserted in any suitable fashion, including pumping or extruding the flexible container and the syntactic material into the free flooded cavity.

At step 706, the flexible container may be heated after the flexible container is inserted into the free flooded cavity. The flexible container may be heated using any suitable method, including exposing the flexible container to hot water or hot air. Heating may make the flexible container relatively more malleable than prior to heating. In some embodiments, as the flexible container is heated, the flexible container may become malleable enough to conform to the free flooded cavity on its own without additional shaping (e.g., manual shaping by a human).

At step 708, the flexible container may be formed to the shape of the cavity. The heated flexible container may be substantially malleable and easily conformed to the shape of the cavity. As mentioned above, the heated flexible container may be malleable enough to form to the shape of the cavity without additional assistance. At step 710, the flexible container may be cooled. As it cools, the flexible container and the syntactic material may become relatively rigid. Optionally, the flexible container may be removed after cooling, leaving behind the syntactic material inside the free flooded cavity. Removing the flexible container may involve temporarily reheating the flexible container and/or the syntactic material. In some embodiments, the flexible container may be cleaned and reused after removal.

Figure 8:
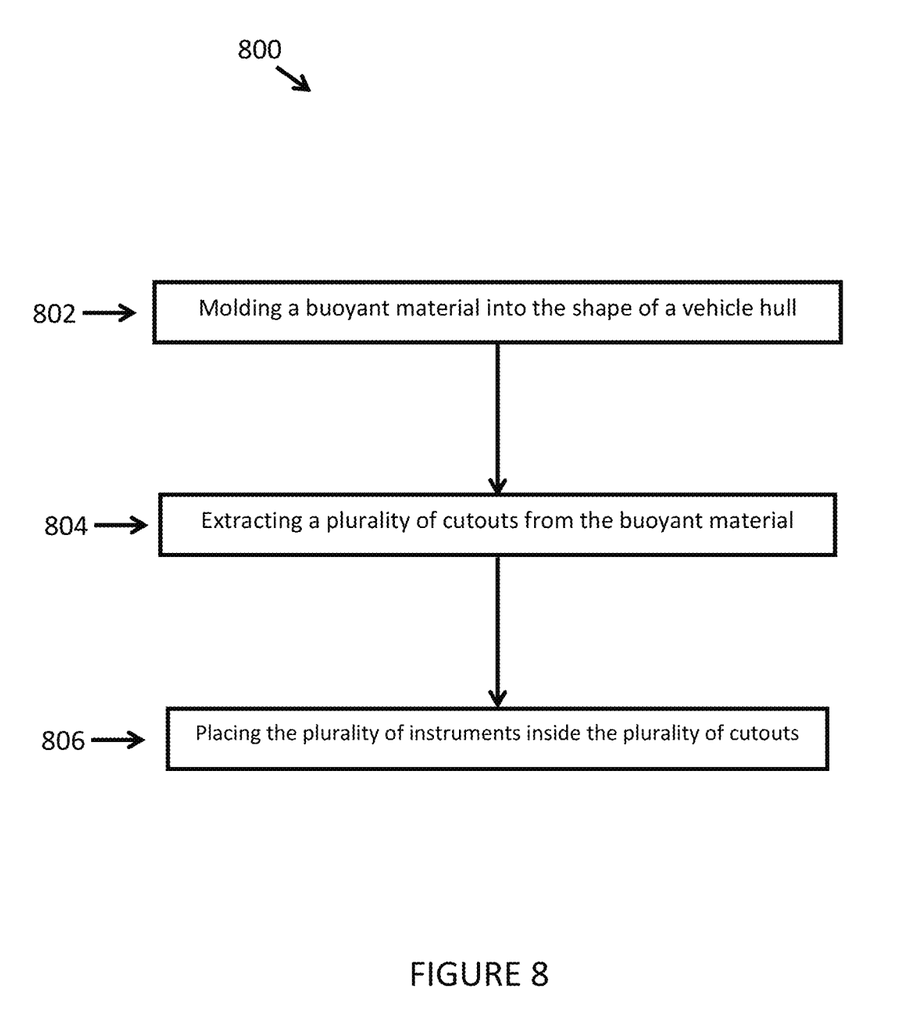
FIG. 8 depicts a process of packing a vehicle according to one illustrative embodiment.

FIG. 8 depicts a process of packing a vehicle according to one illustrative embodiment. Process 800 comprises molding a buoyant material into the shape of a vehicle hull at step 802, extracting a plurality of cutouts from the buoyant material at step 804, and placing the plurality of instruments inside the plurality of cutouts at step 806.

At step 802, a buoyant material may be molded to the shape of the vehicle hull. As an illustrative example, the vehicle hull may be a monocoque structure with an external shell. The buoyant material may be machined to substantially match the shape of the external shell. In some embodiments, the buoyant material is a syntactic foam. In some embodiments, the buoyant material may substantially fill the interior of the vehicle hull.

At step 804, a plurality of cutouts may be extracted from the buoyant material. The plurality of cutouts may be extracted using any suitable method, including, but not limited to, cutting, machining, lathing, melting, grinding, or sanding. Each of the plurality of cutouts may be specifically designed to incorporate one or more instruments. For example, each of the plurality of cutouts may conform to the shape of the one or more instruments. The plurality of cutouts may or may not be designed to be open to the external of the vehicle.

At step 806, a plurality of instruments may be placed inside the plurality of cutouts. As mentioned before, each of the instruments may be specifically designed to go into one of the plurality of cutouts. The instruments may be supported by bracketry, and the bracketry may be spring-loaded to absorb shock and vibrations. For example, the bracketry may flex with increased pressure. In this manner, the buoyancy of the vehicle may be maximized by filling the interior of the vehicle with the buoyant material (e.g., syntactic foam), with just enough space to incorporate the vehicle's components and instruments.

It will be apparent to those skilled in the art that such embodiments are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A method of adding buoyancy to an object, comprising:
    enclosing a syntactic material inside a flexible container, wherein the flexible container comprises a plurality of subcontainers;
    heating the flexible container;
    inserting the flexible container into a free flooded cavity inside the object;
    forming the flexible container to a shape of the cavity;
    mixing contents of the plurality of sub-containers, wherein the contents of the plurality of sub-containers become solid after the mixing; and
    cooling the flexible container.

2. The method of claim 1, further comprising removing the flexible container from the cavity.

3. The method of claim 1, further comprising pumping the syntactic material into the flexible container.

4. The method of claim 3, wherein pumping the syntactic material into the flexible container occurs subsequent to inserting the flexible container into the cavity inside the object.

5. The method of claim 1, wherein the syntactic material provides a fixed amount of buoyancy.

6. The method of claim 1, wherein the syntactic material includes at least one of syntactic wax, syntactic foam, and syntactic oil.

7. The method of claim 1, wherein heating the flexible container comprises placing the flexible container in hot water or hot air.

8. The method of claim 1, wherein heating the flexible container occurs subsequent to inserting the flexible container into the cavity inside the object.

9. The method of claim 1, wherein heating the flexible container occurs prior to inserting the flexible container into the cavity inside the object.

10. The method of claim 1, wherein the syntactic material comprises a syntactic oil, and wherein subsequent to heating the flexible container, the syntactic oil remains fluid and the flexible container becomes rigid.

11. The method of claim 1, further comprising solidifying the syntactic material through application of heat or ultraviolet light.

12. The method of claim 1, wherein the flexible container is made from rubber, plastic, or any other flexible material.

13. The method of claim 1, wherein the syntactic material is malleable at a first temperature and rigid at a second temperature.

14. The method of claim 13, wherein the first temperature corresponds to room temperature, and wherein the second temperature is lower than the first temperature.

15. The method of claim 13, wherein the first temperature corresponds to 10 degrees Celsius, and wherein the second temperature is lower than the first temperature.

16. A method of adding buoyancy to an object, comprising:
    enclosing a syntactic material inside a flexible container, wherein the syntactic material is malleable at a first room temperature and rigid at a second temperature lower than the first room temperature;
    heating the flexible container to at least the first room temperature;
    inserting the flexible container into a free flooded cavity inside the object;
    forming the flexible container to a shape of the cavity; and
    cooling the flexible container to the second temperature.

17. A method of adding buoyancy to an object, comprising:
    enclosing a syntactic material inside a flexible container, wherein the syntactic material is malleable at a first room temperature and rigid at a second temperature lower than the first room temperature;
    heating the flexible container to at least the first room temperature;
    inserting the flexible container into a free flooded cavity inside the object;
    forming the flexible container to a shape of the cavity; and
    cooling the flexible container to the second temperature.

* * * * *